United States Patent
Refunjol et al.

(10) Patent No.: US 11,407,931 B2
(45) Date of Patent: Aug. 9, 2022

(54) CROSSLINKING OF CELLULOSE FIBERS

(71) Applicant: SCHLUMBERGER TECHNOLOGY CORPORATION, Sugar Land, TX (US)

(72) Inventors: Giselle Refunjol, Houston, TX (US); Jazmin Godoy-Vargas, Missouri City, TX (US); Mohan Kanaka Raju Panga, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/340,528

(22) PCT Filed: Oct. 12, 2017

(86) PCT No.: PCT/US2017/056340
§ 371 (c)(1),
(2) Date: Apr. 9, 2019

(87) PCT Pub. No.: WO2018/071669
PCT Pub. Date: Apr. 19, 2018

(65) Prior Publication Data
US 2020/0048537 A1   Feb. 13, 2020

Related U.S. Application Data

(60) Provisional application No. 62/407,213, filed on Oct. 12, 2016.

(51) Int. Cl.
*C09K 8/68* (2006.01)

(52) U.S. Cl.
CPC .......... *C09K 8/685* (2013.01); *C09K 2208/08* (2013.01)

(58) Field of Classification Search
None
See application file for complete search history.

(56) References Cited

U.S. PATENT DOCUMENTS

| | | |
|---|---|---|
| 3,692,676 A | 9/1972 | Culter et al. |
| 4,579,667 A | 4/1986 | Echt et al. |
| 5,726,138 A | 3/1998 | Tsaur et al. |
| 6,016,871 A * | 1/2000 | Burts, Jr. ............... C09K 8/685 166/300 |
| 6,239,183 B1 | 5/2001 | Farmer et al. |
| 6,482,866 B1 | 11/2002 | Dahayanake et al. |
| 6,506,710 B1 | 1/2003 | Hoey et al. |
| 6,528,157 B1 | 3/2003 | Hussain et al. |
| 6,703,352 B2 | 3/2004 | Dahayanake et al. |
| 7,169,427 B2 | 1/2007 | Frith et al. |
| 7,303,018 B2 | 12/2007 | Cawiezel et al. |
| 8,039,683 B2 | 10/2011 | Qin et al. |
| 8,900,412 B2 | 12/2014 | Borkar et al. |
| 9,133,583 B2 | 9/2015 | Ballinger |
| 2005/0042192 A1 | 2/2005 | Evans et al. |
| 2013/0048283 A1 | 2/2013 | Makarychev-Mikhailov et al. |
| 2013/0056213 A1 | 3/2013 | Medvedev et al. |
| 2015/0175877 A1* | 6/2015 | Shindgikar ............ C09K 8/605 507/217 |
| 2016/0053599 A1 | 2/2016 | Nguyen et al. |

OTHER PUBLICATIONS

Siqueira et al., "Carboxymethylcellulose (CMC) as a model compound of cellulose fibers and polyamideamine epichlorohydrin (PAE)—CMC interactions as a model of PAE-fibers interactions of PAE-based wet strength papers", Journal of Applied Polymer Science, 2015, vol. 132, Article No. 42144, 10 pages.
International Search Report and Written Opinion issued in International Patent Appl. No. PCT/US2017/056340 dated Apr. 27, 2018; 12 pages.
Examination report issued in Australian Patent Application No. 2017342365 dated Jun. 25, 2021, 3 pages.
Examination report issued in Saudi Arabian patent application 519401523 dated Jan. 25, 2022, with English Summary, 10 pages.
Examination report issued in Australian Patent Application No. 2017342365 dated Mar. 15, 2022, 2 pages.

* cited by examiner

*Primary Examiner* — Jeffrey D Washville
(74) *Attorney, Agent, or Firm* — Cameron R. Sneddon

(57) ABSTRACT

Methods of treating a subterranean formation include forming a treatment fluid including a hydrophilic fiber coated with a water soluble polymer and a crosslinking agent.

9 Claims, 10 Drawing Sheets
(10 of 10 Drawing Sheet(s) Filed in Color)

CROSSLINKING OF CELLULOSE FIBERS

The present application claims priority to U.S. Provisional Application Ser. No. 62/407,213 filed Oct. 12, 2016, which is incorporated herein by reference in its entirety.

BACKGROUND

Hydrocarbons (e.g., oil, natural gas, etc.) may be obtained from a subterranean formation by drilling a wellbore that penetrates the hydrocarbon-bearing formation. Fracturing operations may be conducted in a wellbore to improve the production of fluids from the formation surrounding the wellbore. A variety of fracturing techniques can be employed, and available systems enable multi-stage stimulation to be performed along the wellbore. Hydraulic fracturing techniques generally involve pumping a fracturing fluid downhole and into the surrounding formation upon its fracture due to the high pressures involved.

More specifically, hydraulic fracturing techniques inject a fracturing fluid into a wellbore penetrating a subterranean formation thereby forcing the fracturing fluid against the wellbore walls at pressures high enough to crack or fracture the formation, creating or enlarging one or more fractures. Proppant present in the fracturing fluid is then entrained within the fracture by the ingress of the fracturing fluid into the created or enlarged crack, thereby preventing the fracture from closing and thus providing for the improved flow produced fluids from the formation. Proppant is thus used to hold the walls of the fractures apart in order to create conductive paths that can facilitate the flow of fluids through the formation and into the wellbore after pumping has stopped. Being able to place the appropriate proppant at the appropriate concentration to form a suitable proppant pack is thus important for the success of a hydraulic fracturing operation.

Fibers are incorporated in different oilfield products for various applications. Fibers are used in the fracturing fluids as proppant suspending agents to enable proppant transport down the wellbore and into the fracture by reduction of proppant settling. Additionally, fibers are used in cement fluids to enhance flexural strength of set cement, avoiding failure due to shear and compressional stresses. Another example of fibers in the oilfield is their use in diversion fluids, as well as loss circulation materials due to their ability to bridge in small openings.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present application is directed to a method of cross-linking or binding hydrophilic fibers in a well treatment fluid to form hydrophilic fiber networks. This mechanism may have various applications in oilfield operations with enhancements in aqueous fluids such as higher fluid viscosity, assistance with proppant transport, and aid in fluid diversion.

Other aspects and advantages of the claimed subject matter will be apparent from the following description and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
FIGS. 1A and 1B are microscope images of cellulose fibers with surface attached carboxymethylcellulose according to one embodiment.

Embodiments disclosed herein relate generally to well treatment compositions and methods of using said compositions during well treatment operations. More specifically, embodiments disclosed herein relate to a well treatment compositions that include crosslinking hydrophilic fibers.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

Fibers are well known to be used for various purposes in oilfield treatment operations. For example, methods such as fiber assisted transport have been used to improve particle transport in fracturing and wellbore cleanout operations while reducing the amount of other fluid viscosifiers employed.

Disclosed herein is a method of treating a subterranean formation, the method comprising: forming a treatment fluid comprising: at least one a hydrophilic fiber coated with at least one water soluble polymer, and at least one crosslinking agent, and placing the treatment fluid in the subterranean formation.

For instance, the technology described herein may provide numerous benefits to well treatment fluids. More specifically, such a mechanism can increase viscosity of the treatment fluid simply by the formation of the fiber network resulting in an increase in fluid viscosity and thereby enhancing proppant transport without the need for additional polymers or viscosifiers. Furthermore, in sand control applications, the formation of a fiber network can assist with proppant flow back control, while in heterogeneous fluid placement techniques, such fiber networks can aid in forming stronger proppant-fiber pillars. Furthermore, in diversion applications, the formation of fiber networks can be used as a bridging mechanism of fractures within the subterranean formation.

The term "treatment," or "treating," does not imply any particular action by the fluid. For example, a treatment fluid placed or introduced into a subterranean formation subsequent to a leading-edge fluid may be a hydraulic fracturing fluid, an acidizing fluid (acid fracturing, acid diverting fluid), a stimulation fluid, a sand control fluid, a completion fluid, a wellbore consolidation fluid, a remediation treatment fluid, a cementing fluid, a driller fluid, a frac-packing fluid, or gravel packing fluid Conventionally, synthetic fibers may be used to assist in the formation of the proppant pillars. However, current manufacturing methods for synthetic fibers have limits to the shortest length achievable for the fibers. However, in order for fibers to be effective within a fracture they must be able to enter the fracture and in some instances the fracture width may be less than the shortest length achievable for synthetic fibers, which makes it difficult for even the smallest synthetic fibers to penetrate into the fracture. For example, a fracture width may decrease the further a fracture extends into a formation. Formations that have fractures with widths smaller than the fiber lengths can present problems for proppant placement within said fractures because the fibers that are attempted to be injected therein tend to be screened out and otherwise accumulate at the mouth or openings of the smaller fracture. Therefore, materials that enable efficient proppant transport into fractures, both large and small, are sought after to improve the efficiency of hydraulic fracturing operations.

The term "fracturing" refers to the process and methods of breaking down a geological formation and creating a fracture, such as the rock formation around a wellbore, by pumping fluid at very high pressures (pressure above the determined closure pressure of the formation), in order to increase production rates from or injection rates into a hydrocarbon reservoir. The fracturing methods of the present disclosure may include a composition one or more polymers that may be consolidated to form a polymeric structure upon exposure to a predetermined shear rate in one or more of the treatment fluids, but otherwise use conventional techniques known in the art.

The term "field" includes land-based (surface and sub-surface) and sub-seabed applications. The term "oilfield," as used herein, includes hydrocarbon oil and gas reservoirs, and formations or portions of formations where hydrocarbon oil and gas are expected but may additionally contain other materials such as water, brine, or some other composition.

As used herein, the term "polymer" or "oligomer" is used interchangeably unless otherwise specified, and both refer to homopolymers, copolymers, interpolymers, terpolymers, and the like. Likewise, a copolymer may refer to a polymer comprising only two monomers, or comprising at least two monomers, optionally with other additional monomers. When a polymer is referred to as comprising a monomer, the monomer is present in the polymer in the polymerized form of the monomer or in the derivative form of the monomer. However, for ease of reference the phrase comprising the (respective) monomer or the like is used as shorthand.

Hydrophilic Fiber

In one or more embodiments, disclosed herein is a well treatment fluid composition that includes a hydrophilic fiber coated with a water soluble polymer. For example, the coated hydrophilic fiber may be a cellulose based fiber such as pulp fiber or microfibrillated cellulose. Cellulose itself constitutes the most abundant renewable and environmentally friendly raw material available on earth. For example, raw materials including wood, recycled paper, and agricultural residues such as bagasse, cereal straw, bamboo, reeds, esparto grass, jute, flax, and sisal all are comprised of cellulose fibers that may be converted into a variety of product including pulp fiber. Depending on the particular application requirements, the raw material processing conditions may be altered to produce a variety of cellulose-based materials that vary in terms of dimension and shape. For example, pulp fibers may generally range from 1 micron to 10 millimeters in length, powdered cellulose may generally range from 1 micron to 1 millimeter, nanofibrillated cellulose may generally range from 100 nanometers to 1 micron, microfibrillated cellulose may generally range from 100 nanometers to 500 microns, and nanocrystalline cellulose may generally range from 50 nanometers to 1000 nanometers. The above length distributions, and any other dimensional details that follow, are all based off of the values for dry fibers. It is to be understood that the hydrophilic fibers of the present disclosure, upon their hydration from a dried state, may elongate and/or swell.

The worldwide annual output of pulp fiber is about 400 million tons, making pulp fiber one of the most abundant raw materials worldwide. Pulp production begins with raw material preparation, which may include debarking (for wood), chipping, depithing (for bagasse), among others. After the raw material preparation the lignin is stripped from the cellulosic fibers by mechanical, thermal, and/or chemical processes. Lignin is a three dimensional polymer that binds the cellulosic fibers together and with its removal from the raw material the cellulosic fibers are freed to act independently or for further processing (e.g., into paper, craft board, etc.). Importantly, pulp is a hydrophilic material that is highly flexible (i.e., has a low Young's modulus) and is available in a variety of fiber lengths and diameters. However, other hydrophilic fiber materials having the dimensions and material properties that allow their use in a wide range of fracture widths may be used in one or more embodiments.

In one or more embodiments, the hydrophilic fiber used may have a length with a lower limit of any of 50 microns, 100 microns, 200 microns, 250 microns, 325 microns, 400 microns, or 500 microns, with an upper limit of any of 1.5 millimeters, 2 millimeters, 3 millimeters, 5 millimeters, 6 millimeters, 8 millimeters, or 10 millimeters, where any lower limit can be used in combination with any upper limit. In one or more embodiments, a hydrophilic fiber sample may be further fractionated to achieve a more narrow length distribution within the ranges listed above. In one or more embodiments, the width (e.g., dimension opposite the length) of the hydrophilic fibers may be from about 10 microns to 50 microns, or from about 15 microns to 45 microns, or from about 20 microns to 40 microns. In one or more embodiments, the aspect ratio (length to width) of the hydrophilic fibers used in fracturing fluids of the present disclosure may be from about 5 to 1000, or from about 6.5 to 700, or from about 8 to 500, or from about 10 to 300.

The hydrophilic fibers of the present disclosure are more elastic and/or flexible than a comparably sized synthetic fiber. Without being bound by theory, the increased elasticity and/or flexibility of the hydrophilic fiber is believed to reduce the amount of bridging that occurs at the mouth/opening of fractures smaller than the hydrophilic fibers attempting to penetrate therein, thereby reducing the screening out of the hydrophilic fibers and facilitating their penetration into smaller fractures.

In one or more embodiments, the amount of hydrophilic fibers used in a fracturing fluid may be from about from about 0.012 to about 1.2 wt %, from about 0.06 wt % to about 0.9 wt %, from about 0.12 wt % to about 0.6 wt %, from about 0.18 wt % to about 0.48 wt % and from about 0.24 wt % to about 0.36 wt %.

The amount used may depend on the width of the fractures that are to be penetrated by the fracturing fluid. For example, in some embodiments the amount of hydrophilic fibers needed to effectively transport and place proppant within smaller width fractures may be less than that which is needed in larger width fractures due to the proppant size for smaller fractures being correspondingly smaller and the volume of smaller fractures being smaller.

In one or more embodiments, combinations of fibers (e.g., synthetic and hydrophilic and/or different types of hydrophilic fibers) may be used. For example, simply using one type or size of fiber for all fracture geometries may not achieve an optimized proppant transport and placement profile. For example, there is commonly a fracture width gradient within a formation, with the fracture width tending to be smaller the farther the fracture is from the wellbore. In these instances, some fibers may be too big to penetrate the smaller fractures and therefore cause bridging and/or plugging at the fracture opening/mouth. Conversely, some fibers may be too small to be able to anchor properly within larger fractures and suspend proppant therein.

Water Soluble Polymer

As discussed above, the hydrophilic fiber may be coated with a water soluble polymer, such as, for example, a polysaccharide, a polyelectrolyte or combinations thereof. Specific examples of polysaccharides include substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, cellulose derivatives such as hydroxyethylcellulose (HEC) or hydroxypropylcellulose (HPC), carboxymethylhydroxyethylcellulose (CMHEC) and carboxymethylcellulose (CMC), and synthetic polymers. Specific examples of polyelectrolytes include polyacrylamides, partially hydrolyzed polyacrylamides, partially hydrolyzed polymethacrylamide, sodium alginate, chitosan. Specific examples of polyelectrolyte polymers are described in U.S. Patent Application Pub. Nos. 2013/0056213 and 2013/0048283, the disclosures of which are incorporated by reference herein in their entirety.

Additional examples of water soluble polymer include acrylic acid-acrylamide copolymers, acrylic acid-methacrylamide copolymers, polyvinyl polymers, cellulose ethers, lignosulfonates, and their ammonium, alkali metal, and alkaline earth salts thereof, polyalkyleneoxides, other galactomannans, heteropolysaccharides obtained by the fermentation of starch-derived sugar and their ammonium and alkali metal salts thereof. Suitable examples of biopolymers include gellan, κ-carrageenan, gelatin, agar, agarose, maltodextrin, and combinations thereof. The treatment composition may include any combination of the specific water soluble polymers described above. Additional examples of biopolymers are described in U.S. Pat. Nos. 5,726,138 and 7,169,427, and U.S. Patent Application Pub. No. 2005/0042192, the disclosure of each of which is incorporated by reference herein in its entirety.

The water soluble polymer may be present in an amount of from about 0.6 mg per gram of the hydrophilic fiber added to 120 mg per gram of the hydrophilic fiber added, from about 3 mg per gram of the hydrophilic fiber added to 60 mg per gram of the hydrophilic fiber added, from about 6 mg per gram of the hydrophilic fiber added to 48 mg per gram of the hydrophilic fiber added, from about 9 mg per gram of the hydrophilic fiber added to 30 mg per gram of the hydrophilic fiber added, from about 12 mg per gram of the hydrophilic fiber added to 30 mg per gram of the hydrophilic fiber added and from about 18 mg per gram of the hydrophilic fiber added to 24 mg per gram of the hydrophilic fiber added.

As used herein, the term "coating" merely requires that the water soluble polymer contact the surface and/or adsorb onto the surface of the hydrophilic fiber, resulting in the formation of bonding sites for the hydrophilic fiber. Adsorption of a water soluble polymer is primarily due to similarities between cellulosic backbones and similar chemical nature that induces efficient hydrogen bonds between the polymer and the cellulose surface. Additionally, for cationic polymers the positive charge provides affinity to a slightly negative cellulose fiber surface. In order to efficiently adsorption of a polymer to the fiber surface, the polymer needs to be water soluble, have enough molecular weight to remain on the outer wall of the fiber (about 100,000 g/mol), and have the ability to form hydrogen bonds.

The hydrophilic fiber may also be coated with a resin, such as polyamideamine-epichlorohydrin (PAE) resin that may cross-link with the cellulose carboxylate groups or can self-cross-link. Other resins may include formaldehyde resins, epoxide resins, and aldehyde resins.

Crosslinking Agent

In embodiments, the treatment fluid may comprise one or more cross-linking agents. The phrase "cross-linking agent" refers, for example, to a compound or mixture that assists in the formation of a three-dimensional polymerized structure of the one or more coated hydrophilic fibers. Any crosslinker may be used, for example, organic crosslinkers, inorganic crosslinkers, divalent metals, trivalent metals, and polyvalent metals, such as calcium, iron, chromium, copper, boron, titanium, zirconium, aluminum and the like. Suitable boron crosslinked polymers systems include guar and substituted guars crosslinked with boric acid, sodium tetraborate, and encapsulated borates; borate crosslinkers may be used with buffers and pH control agents such as sodium hydroxide, magnesium oxide, sodium sesquicarbonate, and sodium carbonate, amines (such as hydroxyalkyl amines, anilines, pyridines, pyrimidines, quinolines, and pyrrolidines, and carboxylates such as acetates and oxalates) and with delay agents such as sorbitol, aldehydes, and sodium gluconate. Suitable zirconium crosslinked polymer systems include those crosslinked by zirconium lactates (for example sodium zirconium lactate), triethanolamines, 2,2'-iminodiethanol, and with mixtures of these ligands, including when adjusted with bicarbonate. Suitable titanates include lactates and triethanolamines, and mixtures, for example delayed with hydroxyacetic acid.

The concentration of the crosslinker in the treatment fluid may be from about 0.001 wt. % to about 10 wt. %, such as about 0.005 wt. % to about 2 wt. %, or about 0.01 wt. % to about 1 wt. %.

In some embodiments, the treatment fluid in which the crosslinking is triggered may have any suitable viscosity, such as a viscosity of from about 1 cP to about 1,000 cP (or from about 10 cP to about 100 cP) at the treating temperature, which may range from a surface temperature to a bottom-hole static (reservoir) temperature, such as from about −40° C. to about 150° C., or from about 10° C. to about 120° C., or from about 25° C. to about 100° C., Such hydrophilic fiber network structures may form in the treatment fluid anywhere within, or inside of the surface mixing equipment, such as a POD blender, or between the surface mixing equipment and the downhole formation to be treated. In some embodiments, the shear rate applied to this polymer solution may be adjusted as desired to form a predetermined size of polymeric structures in the treatment fluid. The hydrophilic fiber network may be formed by the agglomeration and/or consolidation of the coated hydrophilic fibers such that at least two of the hydrophilic fibers are connected together.

As used herein, the phrases "crosslinkable fluid," "treatment fluid" or "fluid for treatment" (hereinafter generally referred to as a "crosslinkable fluid" unless specified otherwise) mean, for example, a composition comprising a solvent, a crosslinkable material, which includes any crosslinkable compound and/or substance with a crosslinkable moiety, (hereinafter "crosslinkable component") that may be substantially inert to any produced fluids (gases and liquids) and other fluids injected into the wellbore or around the wellbore, such as workover fluids, and a crosslinking composition which comprises a crosslinker, for example, to seal at least a portion of the area into which the crosslinkable fluid is pumped.

The crosslinkable fluid of the present disclosure may be a solution initially having a very low viscosity that can be readily pumped or otherwise handled. For example, the viscosity of the crosslinkable fluid may be from about 1 cP to about 10,000 cP, or be from about 1 cP to about 1,000 cP, or be from about 1 cP to about 100 cP at the treating temperature, which may range from a surface temperature to a bottom-hole static (reservoir) temperature, such as from about 4° C. to about 80° C., or from about 10° C. to about 70° C., or from about 25° C. to about 60° C., or from about 32° C. to about 55° C.

Crosslinking the crosslinkable fluid of the present disclosure generally increases its viscosity. As such, having the composition in the uncrosslinked/unviscosified state allows for pumping of a relatively less viscous fluid having relatively low friction pressures within the well tubing, and the crosslinking may be delayed in a controllable manner such that the properties of thickened crosslinked fluid are available at the rock face instead of within the wellbore. Such a transition to a crosslinked/uncrosslinked state may be achieved over a period of minutes or hours based on the particular molecular make-up of the crosslinker, and results in the initial viscosity of the crosslinkable fluid increasing by at least an order of magnitude, such as at least two orders of magnitude.

Suitable solvents for use with the crosslinkable fluid in the present disclosure may be aqueous or organic based. Aqueous solvents may include at least one of fresh water, sea water, brine, mixtures of water and water-soluble organic compounds and mixtures thereof. Organic solvents may include any organic solvent with is able to dissolve or suspend the various components of the crosslinkable fluid.

In some embodiments, the crosslinkable fluid may initially have a viscosity similar to that of the aqueous solvent, such as water. An initial water-like viscosity may allow the solution to effectively penetrate voids, small pores, and crevices, such as encountered in fine sands, coarse silts, and other formations. In other embodiments, the viscosity may be varied to obtain a desired degree of flow sufficient for decreasing the flow of water through or increasing the load-bearing capacity of a formation. The rate at which the viscosity of the crosslinkable fluid changes may be varied by the choice of the crosslinker and polymer employed in the crosslinkable fluid. The viscosity of the crosslinkable fluid may also be varied by increasing or decreasing the amount of solvent relative to other components, or by other techniques, such as by employing viscosifying agents. In embodiments, the solvent, such as an aqueous solvent, may represent up to about 99.9 weight percent of the crosslinkable fluid, such as in the range of from about 85 to about 99.9 weight percent of the crosslinkable fluid, or from about 98 to about 99.7 weight percent of the crosslinkable fluid.

The crosslinkable fluids or compositions suitable for use in the methods of the present disclosure comprise a crosslinkable component. As discussed above, a "crosslinkable component," as the term is used herein, is a compound and/or substance that comprises a crosslinkable moiety. For example, the crosslinkable components may contain one or more crosslinkable moieties, such as a carboxylate and/or a cis-hydroxyl (vicinal hydroxyl) moiety that is able to coordinate with the reactive sites of the crosslinker. The reactive sites of the crosslinker may be, for example, the site where the metals (such as Al, Zr and Ti and/or other Group IV metals) are present. The crosslinkable component may be natural or synthetic polymers (or derivatives thereof) that comprise a crosslinkable moiety, for example, substituted galactomannans, guar gums, high-molecular weight polysaccharides composed of mannose and galactose sugars, or guar derivatives, such as hydrophobically modified guars, guar-containing compounds, and synthetic polymers. Suitable crosslinkable components may comprise a guar gum, a locust bean gum, a tara gum, a honey locust gum, a tamarind gum, a karaya gum, an arabic gum, a ghatti gum, a tragacanth gum, a carrageenen, a succinoglycan, a xanthan, a diutan, a hydroxylethylguar hydroxypropyl guar, a carboxymethylhydroxyethyl guar, a carboxymethylhydroxypropylguar, an alkylcarboxyalkyl cellulose, an alkyl cellulose, an alkylhydroxyalkyl cellulose, a carboxyalkyl cellulose ether, a hydroxyethylcellulose, a carboxymethylhydroxyethyl cellulose, a carboxymethyl starch, a copolymer of 2-acrylamido-2methyl-propane sulfonic acid and acrylamide, a terpolymer of 2-acrylamido-2methyl-propane sulfonic acid, acrylic acid, acrylamide, or derivative thereof. In embodiments, the crosslinkable components may present at about 0.01% to about 4.0% by weight based on the total weight of the crosslinkable fluid, such as at about 0.10% to about 2.0% by weight based on the total weight of the crosslinkable fluid.

Additional examples of crosslinking agents include, but are not limited to, one or more multifunctional crosslinking agents such as: dihaloalkanes, haloalkyloxiranes, alkyloxirane sulfonates, di(haloalkyl)amines, tri(haloalkyl)amines, diepoxides, triepoxides, tetraepoxides, bis(halomethyl) benzenes, tri(halomethyl) benzenes, tetra(halomethyl) benzenes, epihalohydrins such as epichlorohydrin and epibromohydrin, poly(epichlorohydrin), (iodomethyl)oxirane, bromo-1,2-epoxybutane, 1,2-dibromoethane, 1,3-dichloropropane, 1,2-dichloroethane, 1-bromo-2-chloroethane, 1,3-dibromopropane, bis(2-chloroethyl)amine, tris(2-chloroethyl)amine, and bis(2-chloroethyl)methylamine, 1,3-butadiene diepoxide, 1,5-hexadiene diepoxide, methyl acrylate, a metal, a metal salt, glutaraldehyde, glyoxal, a zinc-based compound, a zirconium-based compound, and the like.

Furthermore, the treatment fluid may further comprise an amine crosslinking agent such as, for example, tetraethylenepentamine, 2,2'-(Ethylenedioxy)bis(ethylamine), (2-Aminoethoxy)ethylamine, 2,2'-Oxydiethylamine dihydrochloride, 1,11-Diamino-3,6,9-trioxaundecane, and 4,7,10-Trioxa-1,13-tridecanediamine. If so, hydrophilic material may require pretreatment with a carbodiimide, such as as N-(3-Dimethylaminopropyl)-N-ethylcarbodiimide hydrochloride (EDC), to react with the surface of the hydrophilic fiber (e.g., CMC) to form a ester bond that may react in due course with an amine. Additional examples of carbodiimides include N-(3-Dimethylaminopropyl)-N'-ethylcarbodiimide hydrochloride (EDAC), 1-[3-(Dimethylamino)propyl]-3-ethylcarbodiimide methiodide (EDC methiodide), N-Cyclohexyl-N'-(2-morpholinoethyl)carbodiimide metho-p-toluenesulfonate (CME-CDI).

The well treatment composition may further include a salt, such as, for example, potassium chloride, calcium chloride, sodium chloride and mixtures thereof. The salt may be present in an amount of from about 0.1 wt % to about 5 wt %, such as, for example, from about 0.5 wt % to about 3 wt %, from about 0.5 wt % to about 2 wt % and from about 1 wt. % to about 2 wt %. If present, the salt may further reduce the amount of the water soluble polymer in the well treatment composition.

As discussed above, the treatment fluid carrying the one or more polymers may be any well treatment fluid, such as a fluid loss control pill, a water control treatment fluid, a scale inhibition treatment fluid, a fracturing fluid, a gravel packing fluid, a drilling fluid, and a drill-in fluid. The carrier solvent for the treatment fluid may be a pure solvent or a mixture. Suitable solvents for use with the methods of the present disclosure, such as for forming the treatment fluids disclosed herein, may be aqueous or organic based. Aqueous solvents may include at least one of fresh water, sea water, brine, mixtures of water and water-soluble organic compounds and mixtures thereof. Organic solvents may include any organic solvent that is able to dissolve or suspend the various components, such as the chemical entities and/or components of the treatment fluid.

While the treatment fluids of the present disclosure are described herein as comprising the above-mentioned components, it should be understood that the fluids of the present disclosure may optionally comprise other chemically different materials. In embodiments, the fluid may further comprise stabilizing agents, surfactants, diverting agents, or other additives. Additionally, the treatment fluid may comprise a mixture various other crosslinking agents, and/or other additives, such as fibers or fillers, provided that the other components chosen for the mixture are compatible with the intended use of forming a polymeric structure. In embodiments, the treatment fluid of the present disclosure may further comprise one or more components such as, for example, a gel breaker, a buffer, a proppant, a clay stabilizer, a gel stabilizer, a chelating agent, an oxygen scavenger and a bactericide. Furthermore, the treatment fluid or treatment fluid may include buffers, pH control agents, and various other additives added to promote the stability or the functionality of the fluid. The treatment fluid or treatment fluid may be based on an aqueous or non-aqueous solution. The components of the treatment fluid or treatment fluid may be selected such that they may or may not react with the subterranean formation that is to be treated.

In this regard, the treatment fluid may include components independently selected from any solids, liquids, gases, and combinations thereof, such as slurries, gas-saturated or non-gas-saturated liquids, mixtures of two or more miscible or immiscible liquids, and the like, as long as such additional components allow for the formation of a polymeric structure. For example, the fluid or treatment fluid may comprise organic chemicals, inorganic chemicals, and any combinations thereof. Organic chemicals may be monomeric, oligomeric, polymeric, crosslinked, and combinations, while polymers may be thermoplastic, thermosetting, moisture setting, elastomeric, and the like. Inorganic chemicals may be metals, alkaline and alkaline earth chemicals, minerals, and the like. Fibrous materials may also be included in the fluid or treatment fluid. Suitable fibrous materials may be woven or nonwoven, and may be comprised of organic fibers, inorganic fibers, mixtures thereof and combinations thereof.

Surfactants can be added to promote dispersion or emulsification of components of the fluid, or to provide foaming of the crosslinked component upon its formation downhole. Suitable surfactants include alkyl polyethylene oxide sulfates, alkyl alkylolamine sulfates, modified ether alcohol sulfate sodium salts, or sodium lauryl sulfate, among others. Any surfactant which aids the dispersion and/or stabilization of a gas component in the fluid to form an energized fluid can be used. Viscoelastic surfactants, such as those described in U.S. Pat. Nos. 6,703,352, 6,239,183, 6,506,710, 7,303,018 and 6,482,866, each of which are incorporated by reference herein in their entirety, are also suitable for use in fluids in some embodiments. Examples of suitable surfactants also include, but are not limited to, amphoteric surfactants or zwitterionic surfactants. Alkyl betaines, alkyl amido betaines, alkyl imidazolines, alkyl amine oxides and alkyl quaternary ammonium carboxylates are some examples of zwitterionic surfactants. An example of a useful surfactant is the amphoteric alkyl amine contained in the surfactant solution AQUAT 944 (available from Baker Petrolite of Sugar Land, Tex.). A surfactant may be added to the fluid in an amount in the range of about 0.01 wt. % to about 10 wt. %, such as about 0.1 wt. % to about 2 wt. % based upon total weight of the treatment fluid.

Charge screening surfactants may be employed. In some embodiments, the anionic surfactants such as alkyl carboxylates, alkyl ether carboxylates, alkyl sulfates, alkyl ether sulfates, alkyl sulfonates, α-olefin sulfonates, alkyl ether sulfates, alkyl phosphates and alkyl ether phosphates may be used. Anionic surfactants have a negatively charged moiety and a hydrophobic or aliphatic tail, and can be used to charge screen cationic polymers. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Cationic surfactants have a positively charged moiety and a hydrophobic or aliphatic tail, and can be used to charge screen anionic polymers such as CMHPG. In the same manner, a charged surfactant can also be employed to form polymer-surfactant complexes as a method for generating consolidated structures.

In other embodiments, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in aqueous energized fluids.

Friction reducers may also be incorporated in any fluid embodiment. Any suitable friction reducer polymer, such as polyacrylamide and copolymers, partially hydrolyzed polyacrylamide, poly(2-acrylamido-2-methyl-1-propane sulfonic acid) (polyAMPS), and polyethylene oxide may be used. Commercial drag reducing chemicals such as those sold by Conoco Inc. under the trademark "CDR" as described in U.S. Pat. No. 3,692,676 or drag reducers such as those sold by Chemlink designated under the trademarks FLO1003, FLO1004, FLO1005 and FLO1008 have also been found to be effective. These polymeric species added as friction reducers or viscosity index improvers may also act as excellent fluid loss additives reducing or even eliminating the use of conventional fluid loss additives. Latex resins or polymer emulsions may be incorporated as fluid loss additives. Shear recovery agents may also be used in embodiments. The above friction reducers, such as polyacrylamide, may also be crosslinking agents.

Embodiments may also include proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it may be from about 20 to about 100 U.S. Standard Mesh in size. With synthetic proppants, mesh sizes about 8 or greater may be used. Naturally occurring materials may be underived and/or unprocessed naturally occurring materials, as well as materials based on naturally occurring materials that have been processed and/or derived. Suitable examples of naturally occurring particulate materials for use as proppants include: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particulation, processing, etc.

The concentration of proppant in the fluid can be any concentration known in the art. For example, the concentration of proppant in the fluid may be in the range of from about 0.03 to about 3 kilograms of proppant added per liter of liquid phase. Also, any of the proppant particles can further be coated with a resin to potentially improve the strength, clustering ability, and flow back properties of the proppant.

A fiber component, in addition to the hydrophilic fiber discussed above, may be included in the fluids to achieve a variety of properties including improving particle suspension, and particle transport capabilities, and gas phase stability. The fiber component may also be hydrophilic or hydrophobic in nature. The fiber component can be any fibrous material, such as, for example, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp. Wichita, Kans., USA, 67220. Other examples of useful fiber components include, but are not limited to, polylactic acid polyester fibers, polyglycolic acid polyester fibers, polyvinyl alcohol fibers, and the like. The fiber component may present in the amounts described above for the hydrophilic fiber.

Embodiments may further use fluids containing other additives and chemicals that are known to be commonly used in oilfield applications by those skilled in the art. These include materials such as surfactants in addition to those mentioned hereinabove, breaker aids in addition to those mentioned hereinabove, oxygen scavengers, alcohol stabilizers, scale inhibitors, corrosion inhibitors, fluid-loss additives, bactericides and biocides such as 2,2-dibromo-3-nitrilopropionamine or glutaraldehyde, and the like. Also, they may include a co-surfactant to optimize viscosity or to minimize the formation of stable emulsions that contain components of crude oil.

In one or more embodiments, the fluid system may include a thickener selected from natural polymers including guar (phytogenous polysaccharide) and guar derivatives (e.g., hydroxypropyl guar and carboxymethylhydroxypropyl guar) and synthetic polymers including polyacrylamide copolymers. Additionally, viscoelastic surfactants that form elongated micelles are another class of non-polymeric viscosifiers that may be added to the fluid in addition to or independently from the polymeric thickeners. Other polymers and other materials, such as xanthan, scleroglucan, cellulose derivatives, polyacrylamide and polyacrylate polymers and copolymers, viscoelastic surfactants, and the like, can be used also as thickeners. For example, water with guar represents a linear gel with a viscosity that increases with polymer concentration.

In hydraulic and acid fracturing, a first fluid called the pad may be injected into the formation to initiate and propagate the fracture. This is followed by a second fluid that contains a proppant to keep the fracture open after the pumping pressure is released. The hydrophilic fibers of the present disclosure may be included in either fluid, and in particular embodiments, may be included in the second fluid to help suspend proppants.

However, it is envisioned that the hydrophilic fibers may be used for carrying out a variety of subterranean treatments/wellbore operations including, but not limited to, drilling operations, diverting treatments, gravel packing, zonal isolation, or downhole delivery. Such operations are known to persons skilled in the art and involve pumping a wellbore fluid into a wellbore through an earthen formation and performing at least one wellbore operation while the wellbore fluid is in the wellbore. Depending on the type of operation being performed, the size of the fibers selected may vary, i.e., to form a plug in a diversion, longer fibers (relative to a fracture width) may be selected.

Additional methods may be employed to implement this technology in the oilfield. For example, the cellulose fiber may be with the water soluble polymer and the resulting product may be dried into sheets, which can later be dispersed into an aqueous medium with a cross-linking agent.

Another technique includes forming pellets of pulp (e.g., average diameter of 1-1000 microns) that are held together by drying the fiber. The dried fibers may then be added to aqueous medium and are dispersed in aqueous medium. A crosslinking agent may then be added to crosslink the dispersed fibers in the aqueous medium.

Another technique is forming pellets by first coating the hydrophilic fibers with the water soluble polymers. A cross-linking agent may then be added and the resulting solution dried to form pellets. The pellets may then be added to a mixing device, such that the crosslinked bonds may be removed by breakers or breaking agent, resulting in dispersion of the fibers in the aqueous medium.

The crosslinking agent may further include a delay agent such that the crosslinking occurs farther into the formation to form diversion plugs on the high pressure side.

The foregoing is further illustrated by reference to the following examples, which are presented for purposes of illustration and are not intended to limit the scope of the present disclosure.

EXAMPLES

Example 1

Example 1(a)

The fibers were first treated to attach a coating of carboxymethyl cellulose (CMC) to the surface. The following steps were taken to achieve this:
1. CMC was fully hydrated by adding 0.12 wt % of CMC to 100 mL of water and mixed at 3000 rpm in a Waring blender for 20 min.
2. After hydration was completed, added 2 wt % of dry cellulose fibers to the Waring blender with hydrated CMC. In addition, 0.5 wt % of calcium chloride was added to the blender.
3. The components were allowed to mix for 5 minutes in the Waring blender at the same speed.
4. The fluid was heated in a microwave and maintained at a temperature of 95° C., constantly stirring the sample manually for 15 minutes.
5. The fluid was then centrifuged for 10 minutes at 350 rpm. The supernatant was disposed of after centrifugation.
6. A Mettler Toledo moisture analyzer was used to dry the sample. The cellulose fibers were dried at 100° C. for 2 hours.
7. After the cellulose fibers were completely dried, they were let to cool down to room temperature.

Figure 1B:
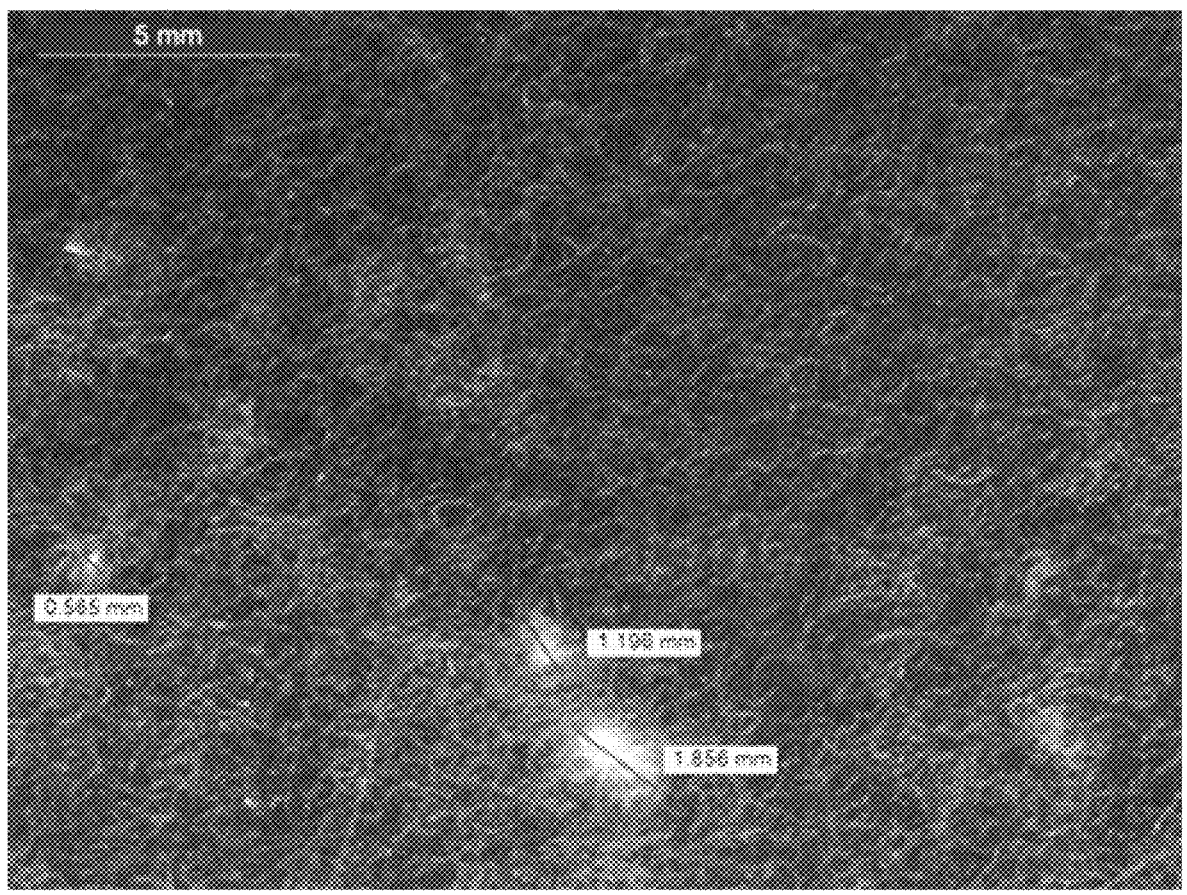

In order to obtain a benchmark, 0.6 wt % of cellulose fibers with surface attached CMC was placed in a Waring blender and re-dispersed in water by mixing at 3000 rpm for 1 minute. A volume of 5 mL of this fluid was placed in a petri dish for optimal microscope imaging, using a Leica Model MSV266. FIGS. 1A and 1B show the microscope images of the re-dispersed cellulose fibers with surface attached CMC. Both figures are the same, except FIG. 1B indicates the sizes of the flocs formed (from left to right 0.565 mm, 1.196 mm, 1.856 mm). The images of FIGS. 1A and 1B were taken as a form of comparison for the following examples.

Example 1(b)

Figure 2A:
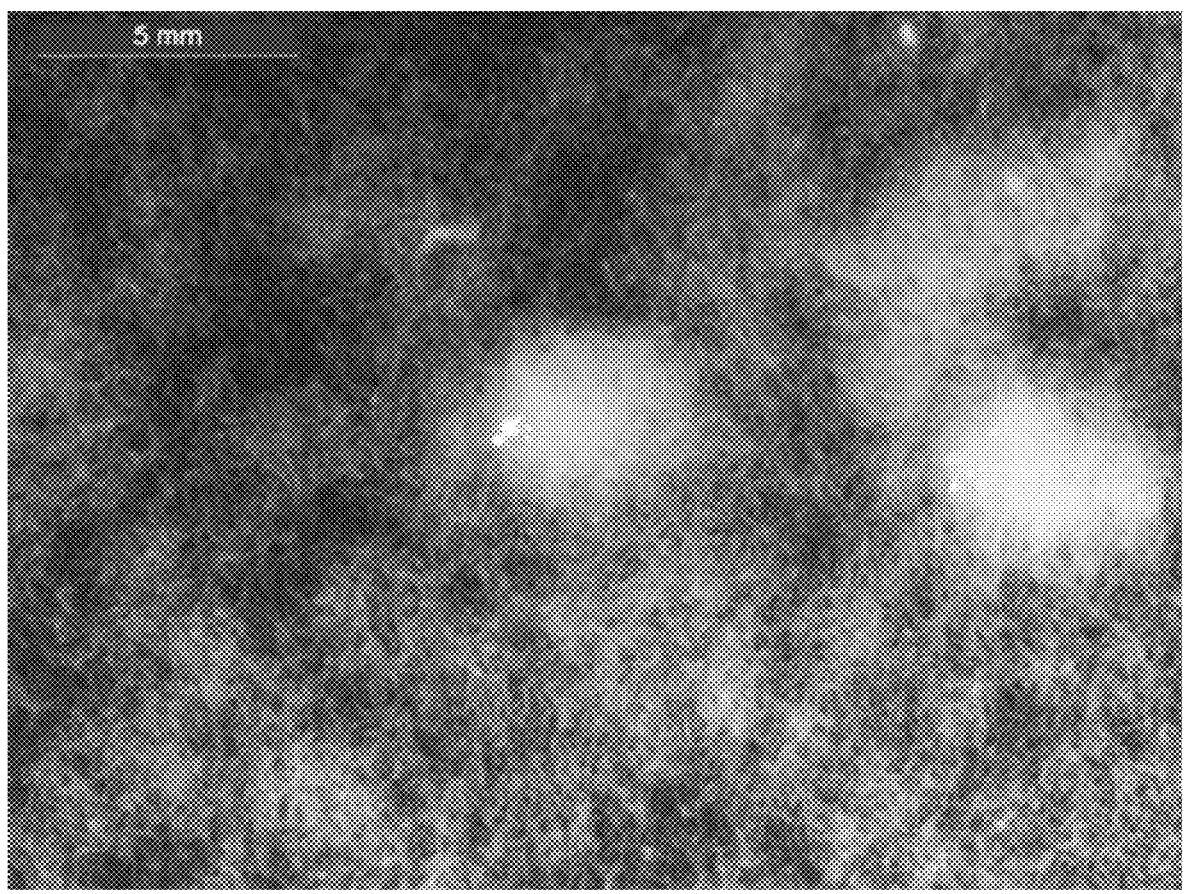
FIGS. 2A and 2B are microscope images of the cellulose fibers of FIGS. 1A and 1B cross-linked using tetraethylenepentamine according to another embodiment.
Figure 2B:
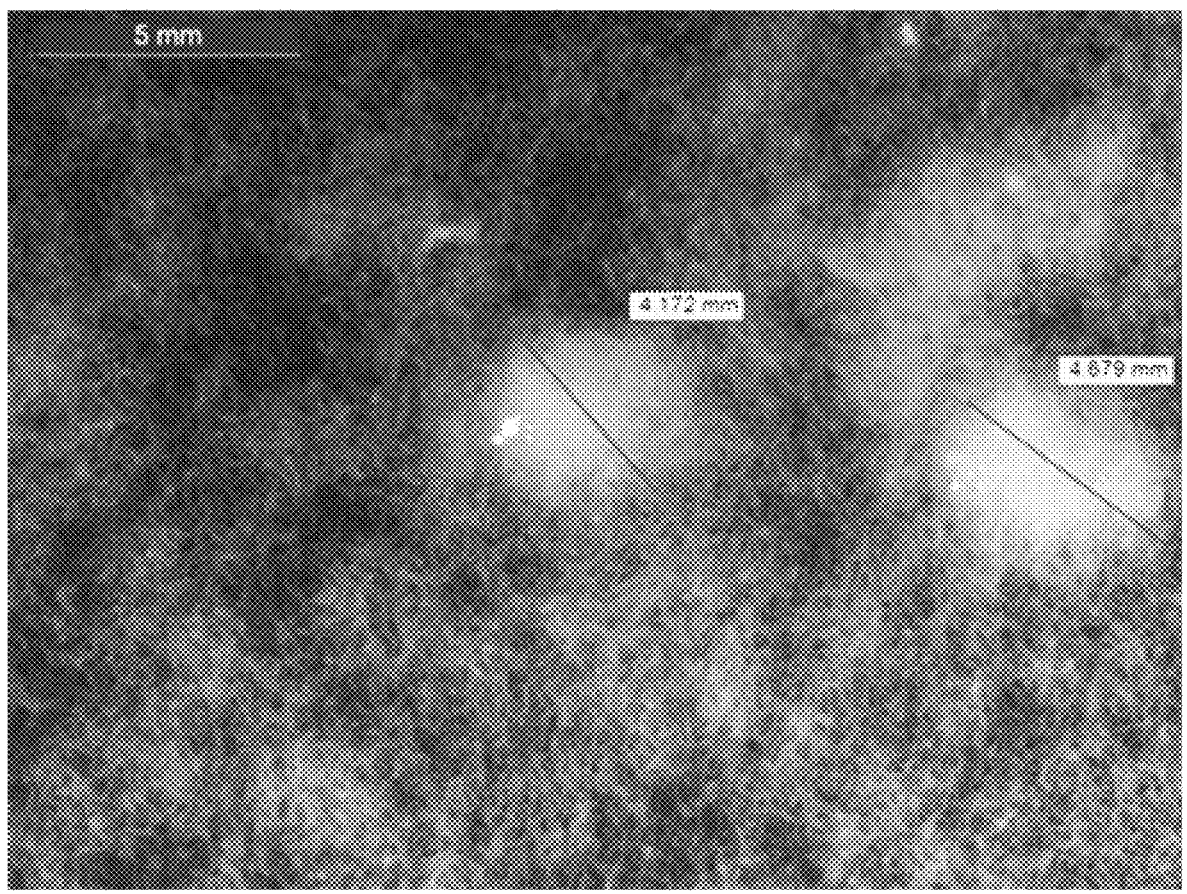

The cellulose fibers with surface attached CMC created in Example 1(a) were used. These fibers were then cross-linked using an amine. A concentration of 0.6 wt % of dry cellulose fibers with surface attached CMC was dispersed in 50 mL of water (using the method of Example 1(a)). The 50 mL of fiber suspension was stirred (Corning PC-4200) using a stirrer bar at 240 rpm. Added 0.3 wt % of N-(3-Dimethylaminopropyl)-N'-ethylcarbodiimide hydrochloride (EDC), used as a carboxyl activating agent to bond with amines. The EDC was used to react with the CMC on the surface of the fibers by means of an ester bond. The cellulose fibers and EDC were left to mix for 5 min at the same speed. Then the fibers were cross-linked using tetraethylenepentamine (TEPA). TEPA was added to the mixture at a concentration of 0.2 wt % and it was all allowed to mix for 4 hours at room temperature at the same speed. FIGS. 2A and 2B are microscope images of the cellulose fibers of FIGS. 1A and 1B cross-linked using tetraethylenepentamine. The images of FIGS. 2A and 2B were taken using the same microscope used to capture the images of FIGS. 1A and 1B. Where, as in the previous example, both pictures are the same except the one on the right depicts dimensions of the flocculates (4.172 mm, 4.679 mm, from left to right). It can be observed that the flocculates formed (white agglomerates) are at least 4 times larger than those observed in FIG. 1, which suggests that the CMC-EDC-TEPA combination was able to cross-link the surface of the fibers and bring them together.

Example 2

This example shows the use of a polyelectrolyte complex (CMC and chitosan) as a method to bring fiber surfaces together. The same dried cellulose fibers with surface attached CMC produced in Example 1(a) were used in this example. A concentration of 0.6 wt % dried cellulose fibers was re-dispersed in 100 mL of water in a Waring blender at 3000 rpm for 1 minute. In parallel, a concentration of 0.12 wt % chitosan of medium molecular weight (~100,000 g/mol) was hydrated. Chitosan hydrates at low pH, therefore, 0.1 mL of acetic acid was added to 100 mL of water in a Waring blender to achieve a pH=4-5. The weighed chitosan amount was then added to the blender cup and stirred at 3000 rpm for 20 min.

Figure 3A:
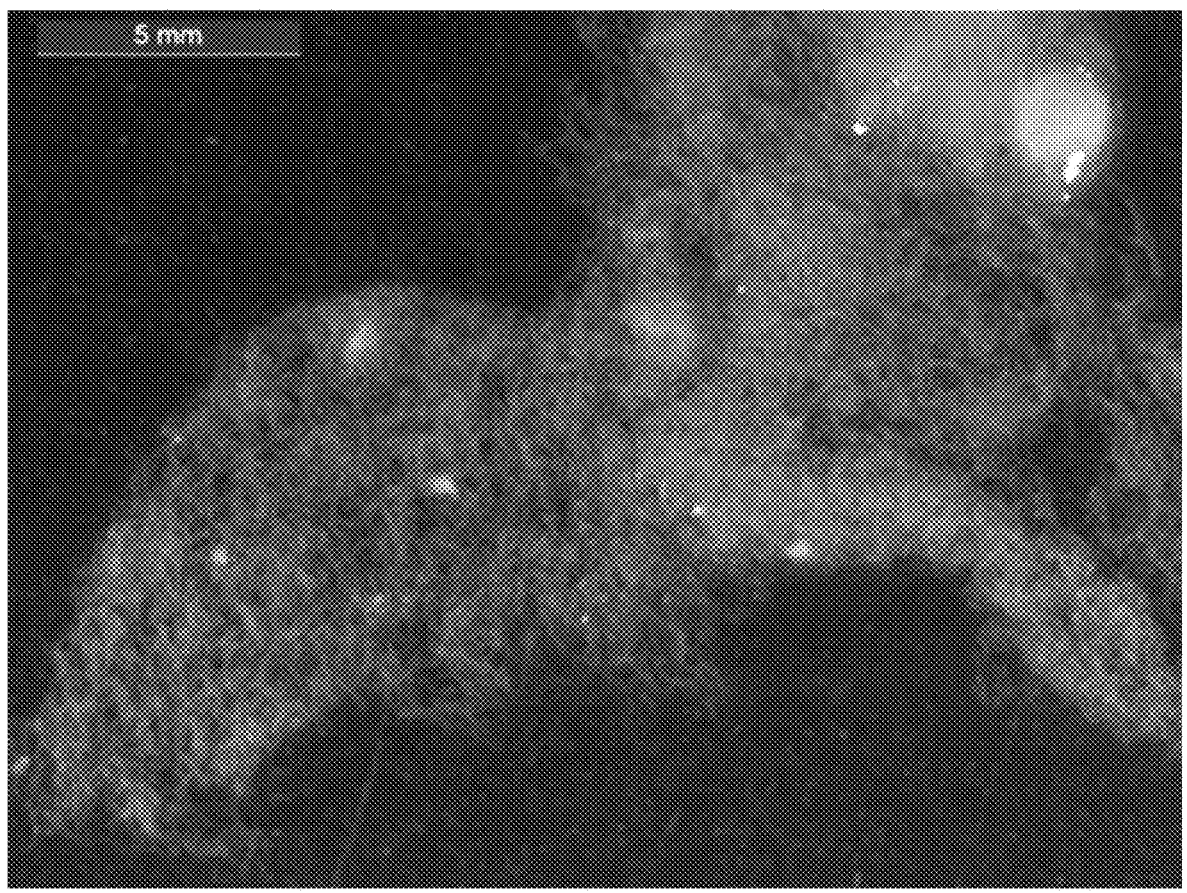
FIGS. 3A and 3B are microscope images of cellulose fibers with surface attached CMC suspended in water with added chitosan according to one embodiment.
Figure 3B:
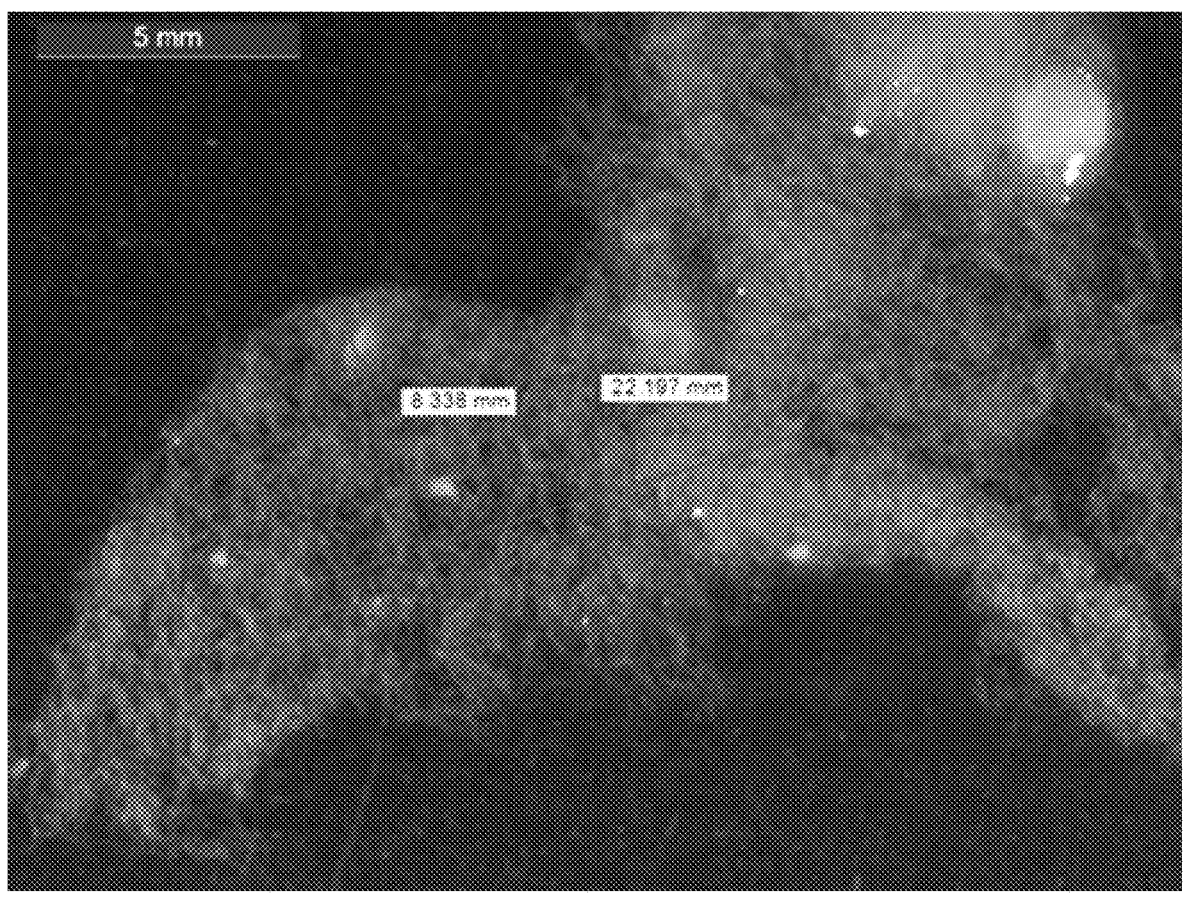

In a petri dish, added 2.5 mL of 0.6 wt % suspended cellulose fiber with surface attached CMC. Then, to the same petri dish, added 2.5 mL of chitosan. The ratio of polymer was 1:0.5 CMC to chitosan. After adding the chitosan, the effect was immediate to where majority of the cellulose fibers aggregated together. FIGS. 3A and 3B are microscope images of cellulose fibers with surface attached CMC suspended in water with added chitosan. The images of FIGS. 3A and 3B were taken using the same method as in the previous examples. Both images are the same, except the image of FIG. 3B depicts the dimensions of the agglomerates: 8.338 mm×22.197 mm. As seen in the images, these aggregates are composed of majority of the fibers in the fluid. Surrounding the aggregates there are almost no observed fibers, which indicate that the polyelectrolyte complex helps in bringing the fiber surfaces together.

Example 3(a)

The fibers were first treated to attach a coating of polyacrylamide to the surface.

The following steps were taken to achieve this:
1. The polymer was fully hydrated by adding 0.12 wt % of polyacrylamide to 100 mL of water and mixed at 3000 rpm in a Waring blender for 20 min.
2. After hydration was completed, added 2 wt % of dry cellulose fibers to the Waring blender with hydrated polyacrylamide.
3. The components were allowed to mix for 5 minutes in the Waring blender at the same speed.
4. The fluid was then centrifuged for 10 minutes at 350 rpm. The supernatant was disposed of after centrifugation.
5. A Mettler Toledo moisture analyzer was used to dry the sample. The cellulose fibers were dried at 100° C. for 2 hours.
6. After the cellulose fibers were completely dried, they were let to cool down to room temperature.

Figure 4A:
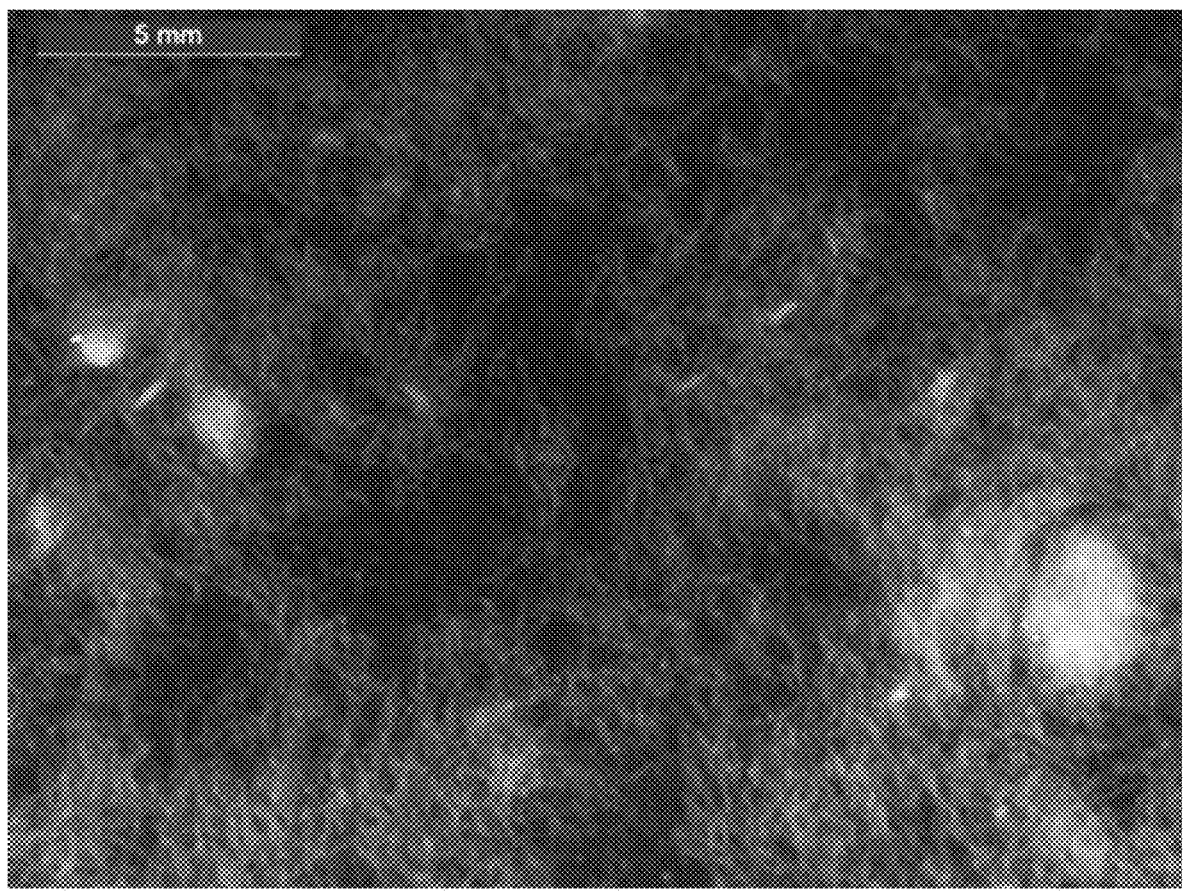
FIGS. 4A and 4B are microscope images of the re-dispersed cellulose fibers with surface attached polyacrylamide.
Figure 4B:
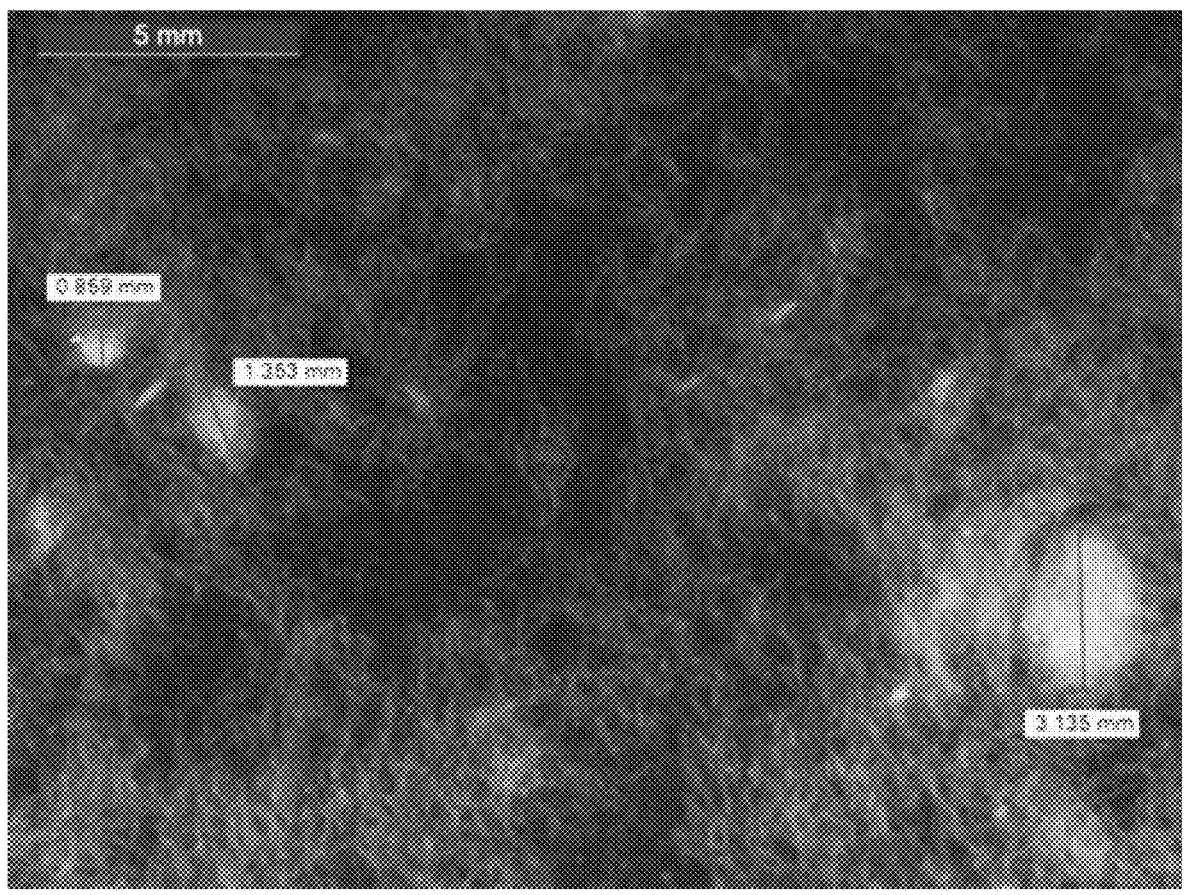

In order to obtain a benchmark, 0.6 wt % of cellulose fibers with surface attached polyacrylamide was placed in a Waring blender and re-dispersed in water by mixing at 3000 rpm for 1 minute. A volume of 5 mL of this fluid was placed in a petri dish for optimal microscope imaging, using a Leica Model MSV266. FIGS. 4A and 4B are microscope images of the re-dispersed cellulose fibers with surface attached polyacrylamide. Both images are the same, except the image of FIG. 4B indicates the sizes of the flocs formed (from left to right 0.859 mm, 1.353 mm, and 3.135 mm). The images of FIGS. 4A and 4B taken as a form of comparison for the following examples.

Example 3(b)

This example shows the use of a zirconium cross-linker as a method to bring the cellulose fiber surfaces together. The same dried cellulose fibers with surface attached polyacrylamide produced in Example 3(a) were used in this example. A concentration of 0.6 wt % dried cellulose fibers was re-dispersed in 100 mL of water in a Waring blender at 3000 rpm for 1 minute. Took 50 mL of the cellulose fiber suspension and placed in a glass beaker on a hot/stirring plate (Corning PC-4200). The fluid was stirred with a stir bar and allowed to heat to 49° C. Once the fluid reached the desired temperature of 49° C., then 0.21 wt % of zirconium dioxide ($ZrO_2$) was added. The mixture was stirred for 1 minute at the previous conditions.

Figure 5A:
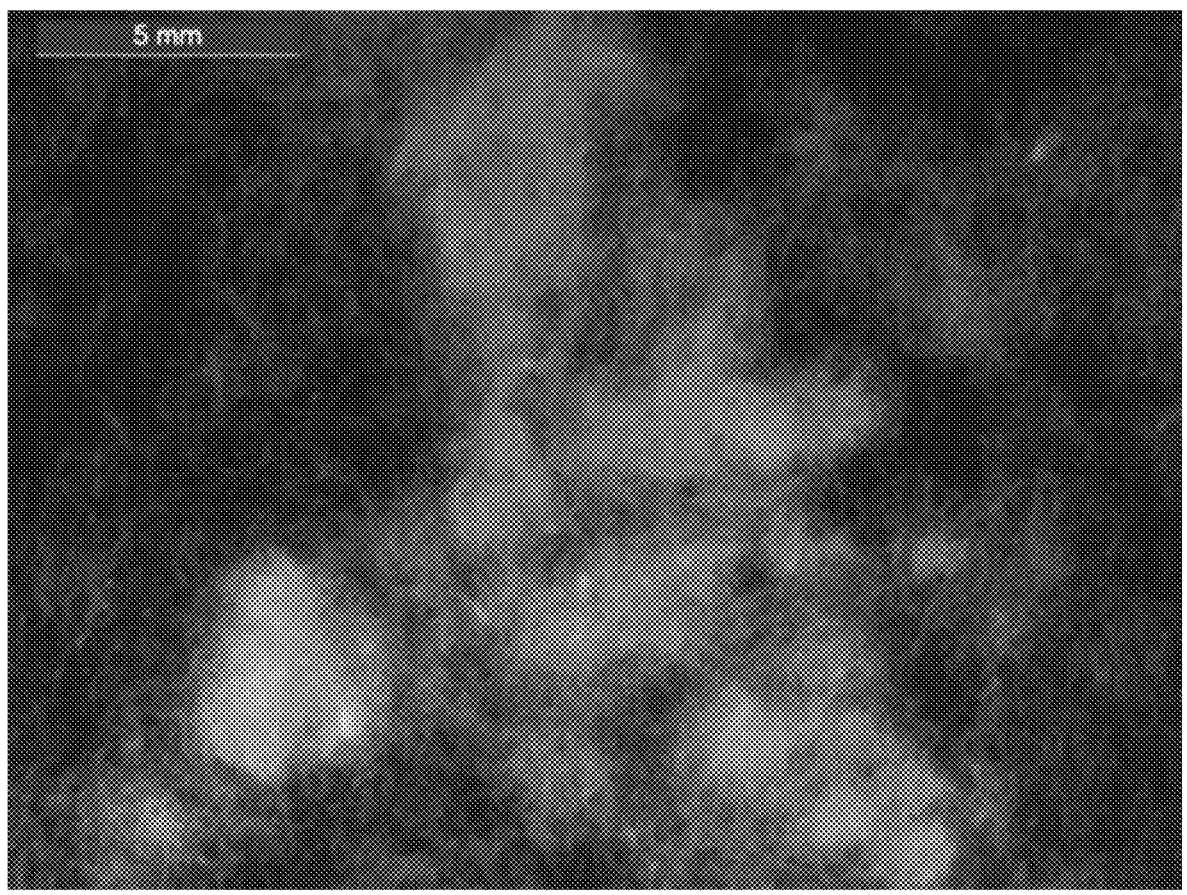
FIGS. 5A and 5B are microscope images of cellulose fibers with surface added polyacrylamide dispersed in water and cross-linked using zirconium dioxide.
Figure 5B:
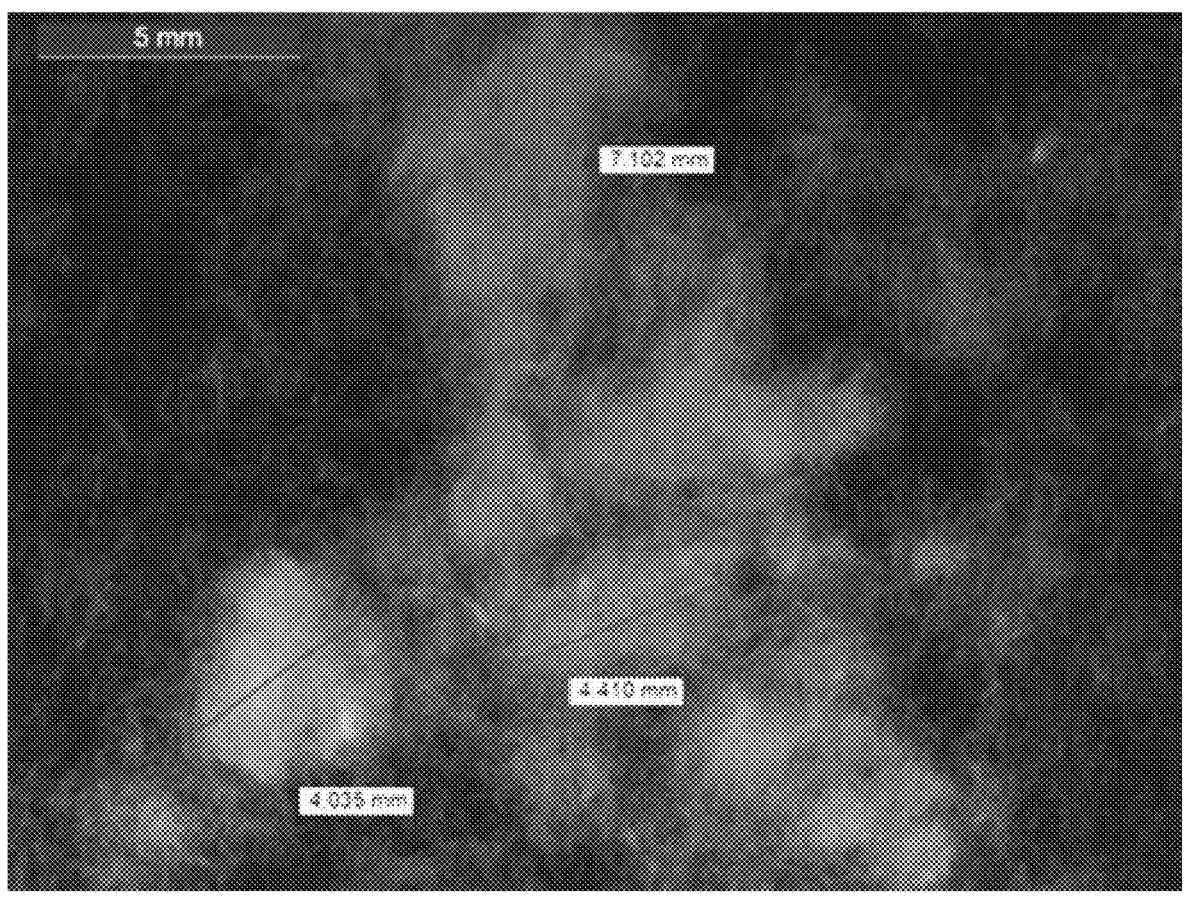

FIGS. 5A and 5B are microscope images of cellulose fibers with surface added polyacrylamide dispersed in water and cross-linked using zirconium dioxide. The images of FIGS. 5A and 5B were taken using the same microscope as in the previous examples. The image of FIG. 5B depicts dimensions of the flocculates (4.035 mm, 4.410 mm, and 7.102 mm from left to right). The flocculates formed (white agglomerates) are larger than those observed in FIG. 4B, which suggests that the zirconium dioxide and polyacrylamide combination was able to cross-link the surface of the fibers and bring them together and form bigger agglomerates.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:
1. A method of treating a subterranean formation, the method comprising:
   forming a treatment fluid comprising: mixing pulp cellulose fibers that have been liquid coated with a water soluble polymer comprising carboxymethylcellulose and then dried, and a crosslinking agent comprising tetraethylenepentamine; and
   placing the treatment fluid in the subterranean formation.
2. The method of claim 1, wherein the amount of the water soluble polymer used in the treatment fluid is from about 0.6 mg per gram of the pulp cellulose fibers added to 120 mg per gram of the pulp cellulose fibers added.
3. The method of claim 1, wherein the water soluble polymer comprises a non-charged polymer.
4. The method of claim 1, wherein the water soluble polymer further comprises a material selected from the group consisting of chitosan, hydroxyethyl cellulose (HEC), guar, carboxymethyl hydroxypropyl guar (CMHPG), polyacrylamide, alginate, polyvinyl alcohol, poly (maleic acid), polyvinyl amine, and combinations thereof.
5. The method of claim 1, wherein the water soluble polymer further comprises a resin.
6. The method of claim 5, wherein the resin comprises a polyamideamine-epichlorohydrin (PAE) resin.
7. The method of claim 5, wherein the resin comprises a formaldehyde resin, an epoxide resin, or an aldehyde resin.
8. The method of claim 1, wherein the crosslinking agent further comprises a material selected from the group consisting of glutaraldehyde, glyoxal, a zinc-based compound, or a zirconium-based compound.
9. The method of claim 1, wherein the crosslinking agent further comprises a metal, or a metal salt.

* * * * *